Patented July 10, 1945

2,380,307

UNITED STATES PATENT OFFICE 2,380,307

OIL-SOLUBLE RESIN AND METHOD OF MAKING THE SAME

Arthur Haroldson, Newark, Del., assignor to Continental-Diamond Fibre Company, Newark, Del., a corporation of Delaware No Drawing. Application August 15, 1942, Serial No. 454,987

13 Claims. (Cl. 260—19)

The present invention relates to an oil-soluble or oil-compatible phenol-formaldehyde resin of novel and advantageous properties and to the method of making the same, and, more particularly, it relates to a resin of this type in which soya bean oil is a component. The invention also relates to the preparation of a novel reaction product, by the use of which soya bean oil is rendered compatible with phenol-formaldehyde resins.

While laminated structures made of phenol-formaldehyde resins of the non-oil-soluble or oil-incompatible type possess good mechanical properties, the laminated structures so prepared cannot be used in the production of stamped intricate parts due to the brittleness of the resin. This difficulty in the case of this type of phenol-formaldehyde resin has led to the development of so-called "oil-soluble" resins. The processes usually employed in the production of resin of the latter type involve the use of some particular phenolic body that produces an oil-soluble resin or the use with the resin or resin components of some modifying agent which renders the resin soluble in oils. In some instances, a combining or converting agent is used to aid the compatibility of the oil with the phenol before the formaldehyde is added. The resins thus prepared are usually compatible with additional oil.

The oxidizing or chemically active oils such as China-wood (tung), oiticica, linseed, and the like are usually used in the preparation of oil-soluble resins. These oils may react through the double bonds, and when the double bonds are conjugated, the reaction is generally assumed to be of the Diels-Alder type. In some cases, particularly when heat is used, the oils may be broken down, forming fatty acids which presumably react with the phenolic compound, but, it is desirable to prevent break-down of the oil to the fatty acids in order to obtain the desirable properties of the oil in the finished resin.

The China-wood oil-phenol-formaldehyde resins possess excellent electrical and mechanical properties and are also very resistant to moisture if the oil is properly combined with the resin-forming components. These resins are used extensively for making laminated insulating products capable of being stamped into intricate parts, and are used for applications requiring low dielectric loss and high dielectric strength properties.

Laminated products are produced from this resin by impregnating paper, textile fabric, asbestos and glass fibrous sheet material, and the like with the potentially reactive resin dissolved in a suitable solvent. The impregnated product is passed through an oven where the solvent is removed and the resin is cured slightly. The impregnated stock is then cut into sheets of the desired size and a laminated structure is formed by superimposing one impregnated sheet upon another until the required thickness is attained. The superposed sheets are placed in a mold, for example between platens of a press, and subjected to accurately controlled heat and pressure to convert the resin into the insoluble, infusible form.

The China-wood oil-resins are very tough and resilient and, hence, it is possible to machine and fabricate laminated structures made by the use of such resins. The China-wood oil-resins, however, are relatively expensive due to the cost of the imported oil, and, as the composition of the oil tends to vary from shipment to shipment, it is difficult to adapt a standard procedure in the manufacturing processes. Furthermore, in the production of varnishes from the China-wood oil-resins, a relatively large quantity of benzene or a similar solvent must be used with the alcohol in order to prepare a satisfactory solution.

The principal object of the present invention is to provide an oil-soluble phenol-formaldehyde resin in which soya bean oil, a relatively cheap domestic oil which can be manufactured to meet specifications, is a component, and which resin upon conversion to the infusible, insoluble state possesses mechanical, electrical, and water resistant properties comparable to those of the China-wood oil-resins.

A further object of the present invention is to provide a heat-converted phenol-formaldehyde resin plasticized by the incorporation of soya bean oil therewith in which the amount of oil required to give plasticizing properties is materially reduced as compared with the amount of China-wood oil required to impart the same plasticizing properties, and in which the oil, weight for weight, produces a softer resin than is obtained when China-wood oil is used.

Another object is to provide an oil-soluble resin which is soluble in alcohol or in solvents composed mostly of alcohol and from which satisfactory varnishes may be prepared without the use of a relatively large quantity of benzene or a similar solvent.

Still another object of the present invention is to provide a reaction product by the use of which soya bean oil is rendered compatible with phenol-formaldehyde resins.

Other objects, including the provision of methods for the preparation of a soya bean oil-phenol-formaldehyde resin and for the preparation of the reaction product compatible with the resin will be apparent from a consideration of this specification and the claims.

In the production of the oil-soluble phenol-formaldehyde resin of the present invention, heat-treated, reactive soya bean oil is made compatible with the resin by treatment with an acid of the type of maleic acid and a compound of the type of methyl abietate ("Abalyn" of the Hercules Powder Company). A chemical study of soya bean oil would not indicate that it could be used in any form in the production of oil-soluble resin, since soya bean oil, unlike China-wood, oiticica, and the other oils used, does not contain any conjugated double bonds. Soya bean oil generally contains 2% linolenic acid (three non-conjugated double bonds), 56% linolic acid (two non-conjugated double bonds), 30% of oleic acid (one non-conjugated double bond), and 12% of a saturated acid.

The term "heat-treated, reactive soya bean oil" is used herein to designate soya bean oil that has been heated to render it more reactive. The heat-treated, reactive soya bean oil has been found to be compatible with phenol-formaldehyde resins when the oil is treated with the chemicals mentioned above which is not the case with similarly treated raw soya bean oil. This indicates a chemical difference between the raw and the heat-treated, reactive oils, but the nature of this chemical difference has not been established, although possibly the heat-treated, reactive oil may contain activated double bonds. Irrespective of the nature of this chemical difference, the term "heat-treated, reactive soya bean oil" as used in this specification and claims designates raw soya bean oil which has been converted by heat treatment into a product which, when treated with an acid of the type of maleic acid and a compound of the type of methyl abietate becomes compatible with phenol-formaldehyde resins.

The heat-treated, reactive soya bean oil may be designated in the trade as "boiled" or "oxidized" or "blown" soya bean oil. It may be prepared from raw soya bean oil by any of the known methods for the production of boiled or blown oil, for example, heating it for an extended period at an elevated temperature, or the oil may be heated and then blown vigorously. Preferably, however, it is prepared by heating the raw oil in the presence of any of the commercial driers, for example, a small amount of litharge or a metal resinate or linoleate. In a typical case, it may be prepared by heating the raw oil for several hours, for example for 4 to 12 hours at 135° C. or for 2 to 8 hours at 265° C., with a small amount of a drier, for example with .01% to .25% of litharge. A blown oil may be produced by heating the oil to 260° C. and, after cooling to 150° C., by blowing vigorously for several hours. It is to be understood, however, that other times, temperatures, and amounts of driers may be used to produce a heat-treated, reactive soya bean oil suitable for use in the present invention.

As previously stated, the heat-treated, reactive soya bean oil is reacted with an acid of the type of maleic acid and a compound of the type of methyl abietate. Referring to the acid, while the use of maleic acid is preferred due to its availability, any other unsaturated dicarboxylic acid containing the —CO—C=C— group may be used, for example, fumaric, citraconic, and mesaconic acid. The term "acid" as used herein includes the anhydrides of the acids as well as the acids since both compounds act in the same manner. In place of methyl abietate, any other alkyl abietate may be employed, for example, the ethyl, propyl, butyl, amyl, etc., abietates.

The mechanism of the reaction between the heat-treated, reactive soya bean oil, the acid, and the abietate is not known, but it is possible that the acid reacts with the abietate which contains the conjugated double bonds

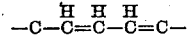

and that the resulting compound is reactive with the heat-treated, reactive soya bean oil. The acid and abietate may be first reacted and the heat-treated, reactive soya bean oil then combined with their reaction product, or the acid, the abietate and the heat-treated, reactive soya bean oil may all be reacted together. Unless otherwise stated, the claims which refer to reacting the acid, abietate, and heat-treated, reactive soya bean oil include both of these procedures. Alternatively, the reaction between the acid and abietate or the reaction between the acid, abietate, and heat-treated, reactive soya bean oil may take place in the presence of all or a portion of the phenolic component of the phenol-formaldehyde resin. When the reaction is carried out in the absence of the phenol, the reaction product may be mixed with a phenol-formaldehyde resin in its initial, fusible, soluble stage, or it may be mixed with the phenol component of the resin or with the phenol and formaldehyde mixture prior to the reaction. When the reaction is carried out in the presence of the phenol, the reaction mixture may be reacted with the formaldehyde, with or without the addition of further amounts of the phenol, to form the resin. The claims which state that the heat-convertible phenol-formaldehyde resin and the reaction product are combined together are generic to all these various methods of making the oil-soluble resin.

The relative proportions of the acid, the abietate, and the heat-treated, reactive soya bean oil with respect to each other may vary widely. The acid is usually employed in relatively small percentages, for example 2% to 8% based on the total weight of the three reactants, although in certain formulations the amount of acid may be as high as 50%. Usually, the acid will not exceed 2% (based on the weight of the phenol). As the amount of acid is increased, the viscosity and rate of cure of the resin is increased. With respect to the abietate, the amount present will usually be between about 35% and 50% based on the total weight of the three reactants—or 15% and 40% based on the weight of the phenol—and preferably between about 42% to 47% based on the total weight of the three reactants—or 17% to 21% based on the weight of the phenol. The heat-treated, reactive soya bean oil will usually be present in an amount between about 30% and 60% based on the total weight of the three reactants—or 15% to 50% based on the weight of the phenol—and preferably between 46% and 49% based on the total weight of the three ingredients—or 18% and 22% based on the weight of the phenol. If desired, other oils may replace a portion of the heat-treated, reactive soya bean oil. Thus, when a harder material is desired without sacrificing either mechanical or electrical properties, China-wood or oiticica oil may replace about 20% to 50% of the heat-treated, reactive soya bean oil.

The reaction between the heat-treated, reactive soya bean oil, abietate, and acid starts at about 155° C. and is slightly exothermic, the temperature usually rising to about 165° C. This reaction, as well as the reaction between the acid and abietate followed by reaction with the heat-treated, reactive soya bean oil (whether conducted in the presence or the absence of the phenol) is preferably conducted by heating the reactants under a reflux condenser for an hour or two at a temperature of 160° C.–165° C. until the reaction is complete. Higher temperatures may be used if desired.

In the production of the oil-soluble resin, the amount of the reaction product of the acid, the abietate, and the heat-treated, reactive soya bean oil associated with the resin will depend on the properties desired in the resin. In general, the oil-soluble resin of the present invention contains from 30% to 70% of the reaction product, or 35% to 80% based on the weight of the phenol, preferably from 30% to 40% of the reaction product or from 35% to 40% based on the weight of the phenol.

The resin with which the reaction product is associated is an oil incompatible, phenol-formaldehyde resin of the heat-hardening type, that is a resin which in its initial stage is soluble, fusible, and potentially reactive and which upon the application of heat is converted into the insoluble, infusible stage. Such resins are prepared by reacting the phenol and the methylene-containing compound in the presence of a basic or alkali catalyst. The reaction product of the acid, abietate, and heat-treated, reactive soya bean oil may be associated with any of the resins of this type in their initial stage. The term a "phenol" is used generically herein and includes the phenols used as the phenolic component of the heat-hardening, oil incompatible phenol-formaldehyde resins, that is, phenol, cresol, xylenol, and mixtures of these compounds. Hexamethylenetetramine and other compounds possessing reactive methylene groups may be substituted in whole or in part for the formaldehyde and these compounds are included herein within the term "formaldehyde." The oil-soluble resin of the present invention is also of the heat-hardening type and may be converted into the final, infusible stage according to the usual procedures.

The oil-soluble resin of the present invention may be dissolved in alcohol or a solvent composed mostly of alcohol, and the resulting varnish may be used in the production of laminated products in the same manner as China-wood oil-resin varnishes, hereinabove described. The resulting products have mechanical and electrical properties and moisture resistance comparable to products made of China-wood oil-resins. It has been found that it requires from about 70% to 75% less heat-treated, reactive soya bean oil than China-wood oil to produce approximately the same plasticizing properties, and that heat-treated, reactive soya bean oil, weight for weight, produces a softer resin than China-wood oil.

If a highly plasticized resin is desired, plasticizers, such as dibutyl phthalate may be added to the varnish. Most of the common plasticizers used for the phenol-formaldehyde resins are compatible with the oil-soluble resins of the present invention. Furthermore, fillers, dyes, and the like may be incorporated in the varnish in accordance with the usual resin practice.

The following examples are illustrative of the invention:

*Example I*

The following materials are placed in a suitable flask provided with a reflux condenser and heated for two hours at 160° C. to 165° C.:

|  | Grams |
|---|---|
| Commercial cresol | 700 |
| Soya bean oil (heat-treated, reactive) | 150 |
| Methyl abietate | 143 |
| Maleic acid | 14 |

After refluxing, the mixture is cooled down to 90° C. and the following materials are added:

|  | Grams |
|---|---|
| Formaldehyde (U. S. P.) | 682.5 |
| Ammonium hydroxide (28–29% $NH_3$) | 49.0 |

The mixture is refluxed for forty-five to sixty minutes, and then the water is removed by distillation under a good vacuum.

The resulting material is a very viscous, yellowish-brown colored clear resin which is soluble in a solvent composed of 85% (by weight) of alcohol and 15% (by weight) of toluene or a similar solvent.

When a small quantity of the varnish contained in a watch glass is placed in an oven at 130° C., for one to four hours, a clear, yellowish-brown, tough film of resin is obtained.

*Example II*

|  | Grams |
|---|---|
| Commercial cresol | 700 |
| Soya bean oil (heat-treated, reactive) | 280 |
| Methyl abietate | 245 |
| Maleic acid | 14 |

The above materials are heated in a suitable reflux apparatus for two hours at 160° C. to 165° C. for two hours. The mixture is then cooled down to 90° C., and the following materials are added:

|  | Grams |
|---|---|
| Formaldehyde (U. S. P.) | 682.5 |
| Ammonium hydroxide (28%–29% $NH_3$) | 49 |

The mixture is refluxed for one hour and then the water is removed by distillation under a good vacuum.

The resulting material is a viscous, yellowish-brown colored, clear resin which is soluble in a solvent composed of 85% (by weight) of alcohol and 15% (by weight) of toluene or a similar solvent.

A clear, yellowish-brown tough film of resin is obtained when a sample of the varnish contained in a watch glass is heated in an oven at 130° C. for one to four hours.

The resin of Example II is less viscous than the resin described in Example I. The resin described in Example II requires a longer period of time to cure (to be converted into the infusible state) than the resin described in Example I.

*Example III*

|  | Grams |
|---|---|
| Commercial cresol | 700 |
| Soya bean oil (heat-treated, reactive) | 280 |
| Methyl abietate | 175 |
| Maleic acid | 21 |

The above materials are heated in a suitable reflux apparatus for two hours at 160° C.–165° C. The mixture is then cooled down to 90° C., and the following materials are added:

|  | Grams |
|---|---|
| Formaldehyde (U. S. P.) | 682.5 |
| Ammonium hydroxide (28%–29% $NH_3$) | 49.0 |

The mixture is refluxed for one hour and then the water is removed by distillation under a good vacuum.

The resulting resin is a very viscous, clear, yellowish-brown colored composition which is soluble in an alcohol-toluene solvent. The resin cures very rapidly.

Example IV

| | Grams |
|---|---|
| Soya bean oil (heat-treated, reactive) | 150 |
| Methyl abietate | 143 |
| Maleic acid | 14 |

The above materials are heated in a suitable reflux apparatus for two hours at 160° C.–165° C. The mixture is then cooled down to 90° C. and the following materials are added:

| | Grams |
|---|---|
| Commercial cresol | 700 |
| Formaldehyde (U. S. P.) | 682.5 |
| Ammonium hydroxide (27%–28% of NH₃) | 49 |

The mixture is refluxed for one hour and then the water is removed by distillation under a good vacuum.

The resulting resin is a very viscous, clear, yellowish-brown colored composition which is soluble in an alcohol-toluene solvent.

Example V

| | Grams |
|---|---|
| Soya bean oil (heat-treated, reactive) | 150 |
| Methyl abietate | 143 |
| Maleic acid | 14 |

The above materials are heated in a suitable refluxing apparatus for one to two hours at 160° C.–165° C. The resulting composition is a viscous, light amber colored, clear composition which possesses resinous characteristics. The composition is compatible with the heat-convertible phenol-formaldehyde resins. For example, the composition can be added to the resin prepared by reacting:

| | Grams |
|---|---|
| Commercial cresol | 700 |
| Formaldehyde (U. S. P.) | 682.5 |
| Ammonium hydroxide (27%–28% NH₃) | 49 |

The above chemicals are refluxed for forty-five minutes and the reaction product is distilled under a good vacuum until all of the water has been removed. The resin is a clear, yellowish-brown, viscous composition which is compatible and may be mixed with the soya bean oil, methyl abietate, maleic acid composition of this example. Heating at an elevated temperature after the resin has been mixed with the composition increases the viscosity which is probably due to a reaction between the oil composition and the phenolic resin.

Example VI 143 gms. of methyl abietate are reacted with 14 gms. of maleic acid at a temperature of 160° C.–165° C. for one hour. 150 gms. of heat-treated, reactive soya bean oil is then reacted with the maleic acid-methyl abietate composition for one-half to one hour at 160° C.–165° C. The resulting composition is cooled down to 90° C. and the following materials are added:

| | Grams |
|---|---|
| Commercial cresol | 700 |
| Formaldehyde (U. S. P.) | 682.5 |
| Ammonium hydroxide (27%–29% NH₃) | 49.0 |

The mixture is refluxed for sixty minutes and is then distilled under a good vacuum until all of the water has been removed. The resulting resin may be heated for a short time to increase the viscosity. The resin is soluble in an alcohol-toluene solution.

Example VII

| | Grams |
|---|---|
| Cresol (commercial grade) | 700 |
| Soya bean oil (heat-treated, reactive) | 150 |
| China-wood oil | 75 |
| Methyl abietate | 143 |
| Maleic acid | 14 |

The above materials are heated in a flask connected to a reflux condenser for ninety minutes at 160° C.–165° C. The resulting material is a dark brown viscous composition. The composition is cooled down to 90° C. and the following materials added:

| | Grams |
|---|---|
| Formaldehyde (U. S. P.) | 682.5 |
| Ammonium hydroxide (27%–29% NH₃) | 49.0 |

The mixture is refluxed for one hour and is then distilled until all of the water has been removed. The resulting resin is a yellowish-amber colored viscous composition soluble in an alcohol-toluene solution.

Example VIII

| | Grams |
|---|---|
| Cresol (commercial) | 700 |
| Soya bean oil (heat-treated, reactive) | 150 |
| Methyl abietate | 143 |
| Maleic acid | 14 |

The above materials are heated in a reflux apparatus for two hours at 160° C. to 165° C. The mixture is then cooled down to 90° C. and the following materials added:

| | Grams |
|---|---|
| Formaldehyde (U.S.P.) | 682.5 |
| Ammonium hydroxide (27%—29% NH₃) | 49.0 |

The mixture is refluxed for fifty-five minutes and then the water is removed by distillation under a good vacuum.

The resulting resin is a very viscous, clear, yellowish-brown colored composition which is soluble in alcohol or a solvent composed of alcohol and toluene. The resin cures very rapidly.

Considerable modification is possible in the proportions of the ingredients of the acid-abietate-heat-treated, reactive soya bean oil composition and in the amounts of this composition associated with the phenol-formaldehyde resin, as well as in the processes of preparing the composition and the oil-soluble resin, without departing from the essential features of the invention.

I claim:

1. The process of making an oil-soluble phenol-formaldehyde resin which comprises combining together a heat-convertible, oil-incompatible phenol-formaldehyde resin and a reaction product obtained by heating together an unsaturated dicarboxylic acid having a —CO—C=C— group, an abietate of an alkyl alcohol having 1 to 5 carbon atoms and heat-treated, reactive soya bean oil.

2. The process of making an oil-soluble phenol-formaldehyde resin which comprises combining together a heat-convertible, oil-incompatible phenol-formaldehyde resin in its fusible, soluble stage and a reaction product obtained by heating together maleic acid, methyl abietate and heat-treated, reactive soya bean oil.

3. The process of making an oil-soluble phenol-formaldehyde resin which comprises heating together an unsaturated dicarboxylic acid having a —CO—C=C— group, an abietate of an alkyl alcohol having 1 to 5 carbon atoms and heat-treated, reactive soya bean oil to form a reaction product, and mixing said reaction product with a heat-convertible, oil-incompatible phenol-formaldehyde resin.

4. The process of making an oil-soluble phenol-formaldehyde resin which comprises heating together maleic acid, methyl abietate and heat-treated, reactive soya bean oil to form a reaction product, and mixing said reaction product with a heat-convertible, oil-incompatible phenol-formaldehyde resin.

5. The process of making an oil-soluble phenol-formaldehyde resin which comprises heating maleic acid and methyl abietate to form a reaction product, heating said reaction product with heat-treated reactive soya bean oil to form a second reaction product, and mixing said second reaction product with a heat-convertible, oil-incompatible phenol-formaldehyde resin.

6. The process of making an oil-soluble phenol-formaldehyde resin which comprises heating together an unsaturated, dicarboxylic acid having a —CO—C=C— group, an abietate of an alkyl alcohol having 1 to 5 carbon atoms and heat-treated, reactive soya bean oil to form a reaction product, mixing said reaction product with the components, which upon reaction normally form a heat-convertible, oil-incompatible phenol-formaldehyde resin, and heating said mixture to form a heat-convertible, oil-soluble, phenol-formaldehyde resin.

7. The process of making an oil-soluble phenol-formaldehyde resin which comprises heating together maleic acid, methyl abietate and heat-treated, reactive soya bean oil to form a reaction product, mixing said reaction product with the components which upon reaction normally form a heat-convertible, oil-incompatible phenol-formaldehyde resin, and heating said mixture to form a heat-convertible, oil-soluble phenol-formaldehyde resin.

8. The process of making an oil-soluble phenol-formaldehyde resin which comprises heating together an unsaturated dicarboxylic acid having a —CO—C=C— group, an abietate of an alkyl alcohol having 1 to 5 carbon atoms and heat treated, reactive soya bean oil in the presence of at least a portion of the phenolic component of a heat-convertible, normally oil-incompatible phenol-formaldehyde resin, mixing said product with the other components, including formaldehyde, which upon reaction form a heat-convertible, normally oil-incompatible phenol-formaldehyde resin, and heating said mixture to form a heat-convertible, oil-soluble phenol-formaldehyde resin.

9. The process of making an oil-soluble phenol-formaldehyde resin which comprises heating together maleic acid, methyl abietate and heat-treated, reactive soya bean oil in the presence of at least a portion of the phenolic component of a heat-convertible, normally oil-incompatible phenol-formaldehyde resin, mixing said product with the other components, including formaldehyde, which upon reaction form a heat-convertible, normally oil-incompatible phenol-formaldehyde resin, and heating said mixture to form a heat-convertible, oil-soluble phenol-formaldehyde resin.

10. An oil-soluble, heat-convertible phenol-formaldehyde resin comprising a mixture of a heat-convertible, normally oil-incompatible phenol-formaldehyde resin and a reaction product obtained by heating together an unsaturated dicarboxylic acid having a —CO—C=C— group, an abietate of an alkyl alcohol having 1 to 5 carbon atoms and heat-treated, reactive soya bean oil.

11. An oil-soluble, heat-convertible phenol-formaldehyde resin comprising a mixture of a heat-convertible, normally oil-incompatible phenol-formaldehyde resin and a reaction product obtained by heating together maleic acid, methyl abietate, and heat-treated, reactive soya bean oil.

12. An article of manufacture comprising an infusible, insoluble phenol-formaldehyde resin resulting from the heat-conversion of a mixture of a heat-convertible, normally oil-incompatible phenol-formaldehyde resin and a reaction product obtained by heating together an unsaturated dicarboxylic acid having a —CO—C=C— group, an abietate of an alkyl alcohol having 1 to 5 carbon atoms, and heat-treated, reactive soya bean oil.

13. An article of manufacture comprising an infusible, insoluble phenol-formaldehyde resin resulting from the heat-conversion of a mixture of a heat-convertible, normally oil-incompatible phenol-formaldehyde resin and a reaction product obtained by heating together maleic acid, methyl abietate, and heat-treated reactive soya bean oil.

ARTHUR HAROLDSON.